Figure 1:
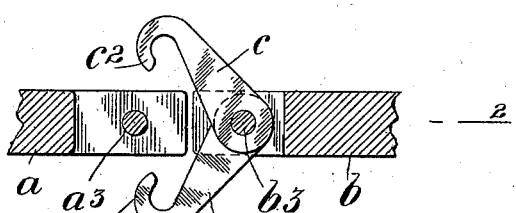

No. 750,404. PATENTED JAN. 26, 1904.
A. H. B. SHARPE.
FASTENING DEVICE FOR DRIVING BELTS.
APPLICATION FILED JULY 3, 1903.
NO MODEL.

WITNESSES
F. A. Stewart
C. E. Mulreany

INVENTOR
Alfred H. B. Sharpe
BY Edgar Tate & Co.
ATTORNEYS

No. 750,404. Patented January 26, 1904.

UNITED STATES PATENT OFFICE.

ALFRED HORATIO BELL SHARPE, OF LINCOLN, ENGLAND, ASSIGNOR OF ONE-THIRD TO JOHN HENRY FOSTER, OF LINCOLN, ENGLAND.

FASTENING DEVICE FOR DRIVING-BELTS.

SPECIFICATION forming part of Letters Patent No. 750,404, dated January 26, 1904.

Application filed July 3, 1903. Serial No. 164,123. (No model.)

*To all whom it may concern:*

Be it known that I, ALFRED HORATIO BELL SHARPE, a subject of the King of Great Britain, residing at Lincoln, in the county of Lincoln, England, have invented certain new and useful Improvements in Fastening Devices for Driving-Belts, of which the following is a specification, such as will enable those skilled in the art to which it appertains to make and use the same.

The object of this invention is to provide improved devices for securing the ends of a driving-belt whereby the said ends may be securely connected and disconnected whenever desired; and with this and other objects in view the invention consists in fastening devices for driving-belts constructed as hereinafter described and claimed.

The invention is fully disclosed in the following specification, of which the accompanying drawings form a part, in which the separate parts of my improvement are designated by suitable reference characters in each of the views, and in which—

Figure 2:
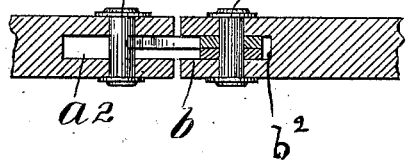
Figure 3:
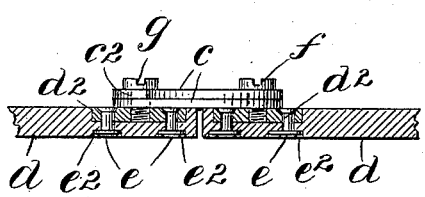
Figure 4:
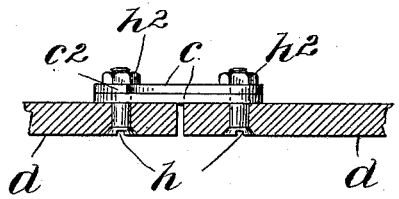

Figure 1 is a sectional side view of the ends of a belt-fastening made according to my invention; Fig. 2, a section thereof on the line 2 2 of Fig. 1; Fig. 3, a view similar to Fig. 2, showing a modification and a different form of belt; Fig. 4, a view similar to Fig. 3, showing another form of construction; and Fig. 5 a plan view of the belt and fastening devices shown in Fig. 4.

The belt shown in Figs. 1 and 2 is a square belt, such as is used on motor-cycles, motor-vehicles, and for similar purposes, and in connecting the ends of this belt, said ends being designated by the reference characters $a$ and $b$, I form therein transverse slots $a^2$ and $b^2$, through which are passed rivets $a^3$ and $b^3$, said rivets being secured in the ends of the belt in any desired manner. On one of the rivets—the rivet $b^3$, shown in the drawings—is pivoted two similar fastening devices $k$, each of which is provided at its free end with a hook $c^2$, which opens inwardly, and in practice in order to secure the ends of the belt the said ends are forced together and the hooks $c^2$ are swung inwardly and engaged with the rivet $a^3$.

In the construction shown in Fig. 3 an ordinary flat belt is employed, the ends of which are designated by the reference character $d$, and in the corresponding sides of the ends of the belt are countersunk washers $d^2$, and rivets $e$ are passed therethrough, the heads of which are countersunk in the washers $d^2$ and the opposite ends of which are provided with washers $e^2$, which are countersunk in the ends of the belt.

Figure 5:
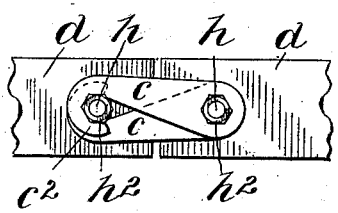

In one of the washers $d^2$, centrally thereof, is secured a screw or pivot-pin $f$, and on this screw or pivot-pin the fastening devices $c$ are mounted, and the other washer $d^2$ is provided with a pivot-pin or screw $g$, with which the hooks $c^2$ are adapted to be connected exactly as with the construction shown in Figs. 1, 2, and 5.

In the construction shown in Figs. 4 and 5 the belt is similar to that shown in Fig. 3, and the ends $d$ thereof are provided with pivot-pins or similar devices $h$, the heads of which are countersunk in one side of the belt or the ends thereof, and in this form of construction the fastening devices $c$ are mounted on one of the pivot-pins $h$ and the hooks $c^2$ thereof engage the other. As shown in Figs. 4 and 5, the pivot-pins $h$ are provided with nuts $h^2$; but these pins may be riveted, if desired.

My invention is not limited to the exact details of construction herein shown and described, and various modifications thereof may be made without departing from the spirit of my invention or sacrificing its advantages.

Having fully described my invention, what I claim as new, and desire to secure by Letters Patent, is—

The herein-described means for securing the ends of a belt together, consisting of two swinging hook devices both of which are permanently pivoted at one end to one end of the belt and provided at their opposite ends with oppositely-directed hooks and a pin secured in the other end of the belt and with which said hooks are adapted to engage, substantially as shown and described.

In testimony that I claim the foregoing as my invention I have signed my name, in presence of the subscribing witnesses, this 20th day of June, 1903.

ALFRED HORATIO BELL SHARPE.

Witnesses:
CHARLES FREDERICK FOSTER,
H. W. JAMESON.